United States Patent [19]

Chester

[11] 4,235,754

[45] Nov. 25, 1980

[54] CRACKING CATALYST

[75] Inventor: Arthur W. Chester, Cherry Hill, N.J.

[73] Assignee: Mobil Oil Corporation, New York, N.Y.

[21] Appl. No.: 66,215

[22] Filed: Aug. 10, 1979

Related U.S. Application Data

[62] Division of Ser. No. 928,036, Jul. 25, 1978, Pat. No. 4,181,600.

[51] Int. Cl.$^3$ .......................... B01J 29/12; B01J 29/16
[52] U.S. Cl. ................................ 252/455 Z; 252/417; 208/120
[58] Field of Search ........................... 252/455 Z, 417; 208/120

[56] References Cited

U.S. PATENT DOCUMENTS

| | | | |
|---|---|---|---|
| 2,647,860 | 8/1953 | Plank et al. | 208/120 |
| 3,909,392 | 9/1975 | Horecky, Jr. et al. | 208/120 |
| 4,064,037 | 12/1977 | Graven et al. | 208/120 |
| 4,072,600 | 2/1978 | Schwartz | 208/120 |
| 4,118,430 | 10/1978 | Mooi | 208/120 X |
| 4,148,751 | 4/1979 | Hemler, Jr. et al. | 208/120 X |
| | 10/1979 | Dight et al. | 252/455 Z |

*Primary Examiner*—Carl F. Dees
*Attorney, Agent, or Firm*—Charles A. Huggett; Raymond W. Barclay

[57] ABSTRACT

A metal combustion promoter is introduced to the circulating inventory of catalyst in a catalytic cracking unit as a mixture of particles rich in metal with particles free of metal such that the net concentration of metal in the mixture is about 1 to 10 ppm. According to a preferred embodiment the particles rich in metal contain about 50 ppm of platinum, iridium, osmium, palladium, rhodium, ruthenium or rhenium. When such mixtures are supplied to the circulating inventory, it is found that specific activity of the metal is enhanced in the sense that activity of the mixture for oxidation of carbon monoxide is higher than that of catalyst in which an equal amount of metal is evenly distributed among all the particles.

10 Claims, 2 Drawing Figures

CRACKING CATALYST

This application is a division of copending application Ser. No. 928,036, filed July 25, 1978, now U.S. Pat. No. 4,181,600 granted Jan. 1, 1980.

FIELD OF THE INVENTION

The invention is concerned with modification of the circulating inventory of catalyst in a system for catalytic cracking of hydrocarbons by contact with catalyst in reactor, transfer of catalyst in a continuous manner to a regenerator for burning in air of combustible deposits laid down on the catalyst during cracking and return of the catalyst free of deposits to the reactor. The burning regeneration yields both oxides of carbon. Carbon monoxide contained in the flue gases from regeneration is regarded as an air pollutant when present in large quantities and constitutes a valuable fuel when burned under conditions suited to recovery of the heat of combustion of carbon monoxide to carbon dioxide which can be discharged without detrimental effect. The invention provides an improved technique for combustion of carbon monoxide in the regenerator of a catalytic cracking unit.

BACKGROUND OF THE INVENTION

Catalytic cracking of petroleum fractions is a well-established refinery process. The catalytic cracking apparatus per se comprises a reactor section that contains a reaction zone where fresh feed is mixed with hot regenerated catalyst under cracking conditions to form cracked products and deactivated, coked catalyst; and a regenerator section that contains a regeneration zone where the coked catalyst, after separation from volatile hydrocarbons, is burned by contact with air to form regenerated catalyst. Moving catalyst bed and fluidized bed versions of this process are used. Regardless of the design of the catalytic cracking apparatus, all present-day plants operate with a catalyst inventory that continuously circulates between the reactor section and the regenerator section. The two sections are connected by conduits through which circulation is maintained.

The cracking reaction is endothermic, requiring input of heat to maintain reaction temperature. Only a minor portion of the heat of reaction can be supplied by preheat of the hydrocarbon charge since thermal cracking and production of low octane gasoline components sets in well below the temperature maintained in modern catalytic cracking units, say 850°–1000° F. The necessary heat to bring the charge stock up to catalytic cracking temperature and to supply the endothermic heat of reaction is derived from the catalyst returned from the regenerator, now containing sensible heat absorbed from the heat of burning regeneration in the regenerator section. It is common practice in fluid units of modern design to control the unit for a constant preset top temperature at the point of separating spent catalyst from product vapors in the reactor. A temperature sensor at that point operates a slide valve on the conduit for return of hot regenerated catalyst from the regenerator to reactor, constraining the rate of hot catalyst return to that level which will sustain the preset top temperature in the reactor. Such "heat balanced" units respond rapidly and effectively to changes in the various operating parameters such as nature and preheat of the charge stock, regenerator temperature, catalyst activity including level of coke on regenerated catalyst, and the like.

The behavior of the regenerator, and hence the temperature and residual coke level on regenerated catalyst returned to the reactor, will fluctuate in any given unit with regenerator temperature, rate and temperature of regeneration air admitted to the regenerator. Temperature in the regenerator may be varied within limits independently of regeneration air temperature. A side stream of catalyst may be cycled through a cooler and back to the regenerator, water or steam may be introduced, usually above the fluidized bed in the regenerator to cool all or part of the regenerator. Heating effects, when needed, may be accomplished by burning a torch oil in the regenerator. More recently, additional heat input to the regenerator has been achieved by promoting combustion of carbon monoxide in the regenerator under conditions to transfer the generated heat to the catalyst.

For many years, burning of carbon monoxide in the regenerator was considered a disadvantage because that combustion took place in the "dilute phase" above the fluidized bed. The very low concentration of catalyst in the dilute phase results in the absorption by gases of substantially all the heat of oxidizing carbon monoxide to carbon dioxide, with resultant rapid rise in temperature, often to levels causing damage to internals (cyclone separators, plenum chamber and conduits) at the top of the regenerator. A common expedient to combat the effects of such "after-burning" has been to inject steam or water to areas of possible damage.

It is common practice to operate the regenerator with a limited amount of air feed so that the gaseous combustion products contain less than about 0.2 volume percent oxygen. Under such conditions, substantial concentrations of carbon monoxide (CO) are contained in the flue gas exiting from the regenerator. The actual concentration of carbon monoxide in the flue gas may vary depending on the particular plant, the nature of the catalyst and the detailed operation of the regenerator, but usually it remains in the range of about 4 to about 9 volume percent. The volume ratio of carbon dioxide to carbon monoxide (i.e. $CO_2/CO$ ratio) normally varies from about 0.7 to about 3, and is a measure of the completeness of combustion of the reacted carbon in the coke. Thus, in operating with a limited amount of air, only about three-fourths of the total potential heat of combustion of coke is released in the regenerator itself.

Many refineries continuously feed the flue gas to a CO-boiler to complete the conversion of CO to $CO_2$, and thus generate substantial quantities of process steam for use in the cracking process or elsewhere in the refinery. In general, the CO-boilers used differ in design from refinery to refinery, but they are generally utility boilers of the tube type. In operation, the flue gas is enriched with air and burned in the furnace of the boiler. The boiler ordinarily is equipped to accept at least one other fuel, which is used in start-up, or to supplement the fuel valve of the flue gas, or to provide process steam when the catalytic cracking apparatus itself is shut down.

The more recent developments have involved supply to the regenerator of sufficient air to convert carbon content of the coked catalyst largely to carbon dioxide and to cause oxidation of carbon monoxide to take place in the presence of catalyst at high concentration such that the heat of combustion is transferred to catalyst for use in the process by supply of heat to the reactor. One such approach is to permit temperature to rise in the dilute phase and supply catalyst thereto in amounts adequate to absorb the heat and thus protect regenerator internals while putting the generated heat to work for useful purpose. See Horecky U.S. Pat. No. 3,909,392 dated Sept. 30, 1975. A second technique is to cause the combustion of carbon monoxide to take place in the zone of high catalyst concentration, namely in the dense fluidized bed, by provision of a metal oxidation catalyst.

It has been known for some time that cracking catalysts may be modified by the addition of metal combustion promoters to increase the $CO_2/CO$ ratio, and thus the combustion efficiency in the regenerator. The use of chromium as a promoter for moving-bed type catalytic cracking catalysts is one such example, more fully described in U.S. Pat. No. 2,647,860. In fact, a number of other metals, including nickel, deposited from the feedstock to the cracking process, are also believed to effect some degree of change in the combustion efficiency. Up until recently, however, most of the known metals had the serious drawback that, when included in the cracking catalyst in sufficient quantity to substantially affect the combustion efficiency, they also had a substantial detrimental effect on the cracking selectivity. It is well recognized, for example, that more than extremely small trace amounts of nickel in the feedstock to the cracking unit cause excessive production of coke and dry gas.

It has recently been discovered that very substantial effect on the combustion efficiency can be achieved, with little or no effect in the cracking operation, if certain Group VIII metals, more fully described hereinafter, are added to the cracking catalyst. In fact, the operation of the regenerator can be changed from partial combustion of carbon to substantially complete combustion if the cracking catalyst is promoted with as little as 2 ppm or less of platinum, for example. This development is more fully described in copending U.S. application Ser. No. 649,261, filed Jan. 15, 1976 now U.S. Pat. No. 4,072,600, the entire contents of which are incorporated herein by reference.

The platinum group metals and rhenium have high catalytic activity for oxidation of carbon monoxide and for dehydrogenation of hydrocarbons. Strangely, the oxidation activity is still effective at such low concentration that dehydrogenation activity to produce coke and hydrogen is negligible in the sense that its effect on commercial operation of a cracking unit is not detectable. These promoter metals are introduced to a cracking system by impregnating a cracking catalyst with a suitable amount of metal by impregnation with solutions of such agents as chlorplatinic acid to provide 5 ppm or 1 ppm or other suitable level of metal based on total weight of catalyst. The usually practiced method is to so impregnate the catalyst at the time of manufacture. Alternatively the metal may be added to catalyst circulating in a cracking unit by dissolving an oil soluble metal salt in the charge stock or by injecting an aqueous solution of the metal to a stream of the catalyst.

When impregnated on the catalyst, say at levels of 5 ppm or less, the whole bulk of promoted catalyst has the metal distributed as uniformly as possible through the mass. Catalyst so promoted is then used as "make-up" to an operating unit. That is, a suitable amount of such fresh catalyst is added to the circulating inventory on a continuous or intermittent basis to replace catalyst lost by attrition or deliberately withdrawn to maintain a desired level of cracking activity. Over a period of use the catalyst declines in activity, both cracking activity and metal activity for oxidation of carbon monoxide. To maintain a satisfactory average activity of the total catalyst inventory, a portion of the inventory will be withdrawn continuously or intermittently if attrition is not adequate to the purpose. Replacement of catalyst so lost or deliberately withdrawn provides an inventory of average activity needed. Thus the total inventory at any given time is made up of catalyst which is essentially inactive for both cracking and carbon monoxide oxidation, freshly added catalyst of high activity and all gradations of fading activity in between these extremes. For this purpose, a refiner will have a reserve stock of promoted catalyst. This can constitute a substantial investment in expensive promoted catalyst, particularly for plants which choose to operate in the manner described by Graven and Sailor U.S. Pat. No. 4,064,037 dated Dec. 20, 1977. According to that technique, a catalytic cracker is operated at conditions to provide high levels of carbon monoxide in the flue gas during normal operations, thereby providing fuel for a carbon monoxide fired boiler to generate steam. When the CO boiler is shut down for routine inspection and maintenance or for unscheduled reasons, additions of platinum promoted catalyst and increase in air rate to the regenerator permit continued operation without discharge of excessive amounts of carbon monoxide to the atmosphere.

SUMMARY OF THE INVENTION

Constraints on the manner of applying platinum group and rhenium oxidation activity in cracking catalysts are eased by using a new finding that specific activity of the metal for oxidation of carbon monoxide can be varied by variation in distribution of metal among the particles of a bulk volume of catalyst. As will be shown by data presently to be set forth, a mass of particle form catalyst containing 5 ppm platinum formed by intimate and substantially uniform mixture of one part of catalyst containing 100 ppm platinum with nineteen parts of catalyst free of platinum has a higher stability in retaining activity for oxidizing carbon monoxide than a mass of similar catalyst of uniform particles containing 5 ppm of platinum. It is seen that the same amount of platinum is more effective for the purpose when supplied in the non-uniform type mixture. That property is referred to herein as higher specific activity of platinum in the non-uniform distribution.

The invention therefore contemplates particle form cracking catalyst having a content of promoter metal not more than 5 ppm and constituted by active cracking catalyst particles essentially free of promoter metal in intimate and substantially uniform admixture with particles containing at least 10 ppm up to about 1000 ppm of promoter metal. In its preferred embodiments, the mixed catalyst is constituted by unused catalyst particles, to wit catalyst particles which have not been part of the circulating inventory of the catalytic cracking unit in which the mixture is used prior to mixing of the two types of particles. In its processing aspect, the invention contemplates addition of such preformed mixture to the circulating inventory of a catalytic cracking system. As will appear below, the mixture of metal free and high metal catalyst has a more adverse effect on cracking selectivity than does an equal amount of metal uniformly distributed among the particles if the catalyst is steamed before addition to the unit. That adverse effect is not seen with catalyst which has been calcined without added steam. The unsteamed catalyst is therefore preferred in many situations.

Among the advantages provided by the invention is the flexibility afforded to a refiner operating a CO boiler after the fashion of the above cited U.S. Pat. No. 4,064,037. With storage of only a small quantity of promoted catalyst at 10–1000 ppm of metal, the refiner is prepared to mix fresh unpromoted catalyst with a suitable quantity of high metal catalyst and use the mixture as make-up at the time his CO boiler goes down.

The greatest advantages of the invention are seen with blends in which the promoted portion contains 20–80 ppm of a platinum group metal or rhenium, preferably about 50 ppm of such metal.

Although it is preferred that the support for the CO combustion promoting metal be active cracking catalyst, inert supports such as calcined clay may be used. If the support is an active cracking catalyst, the same may be fresh, unused catalyst or may be an "equilibrium catalyst" withdrawn from an operating cracking unit and impregnated with metal promoter.

BRIEF DESCRIPTION OF DRAWINGS

The relative activities of different blends of catalyst according to the invention are compared to catalyst of uniform promoter distribution by graphical representation in the annexed drawings wherein.

DESCRIPTION OF PREFERRED EMBODIMENTS

Figure 1:
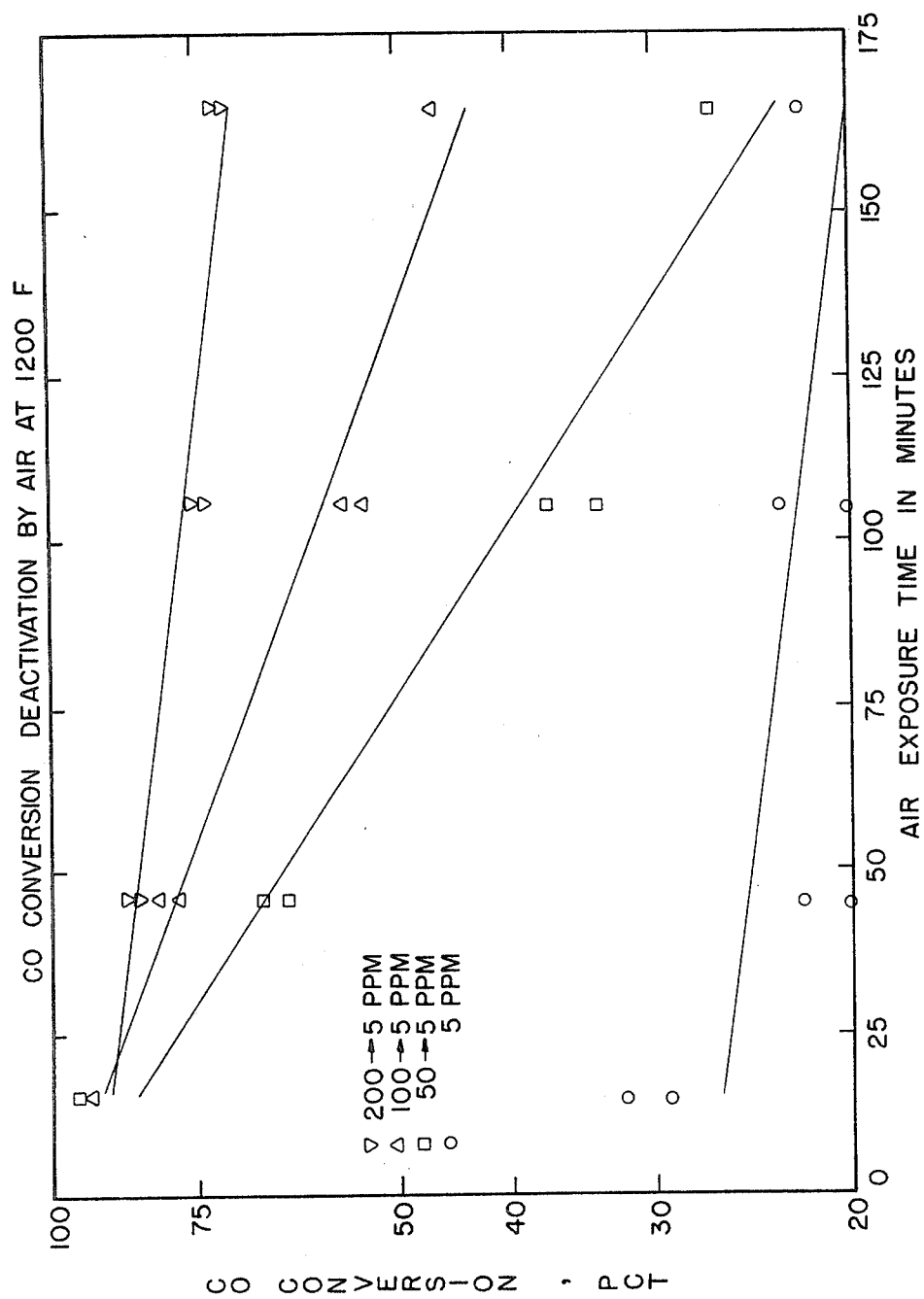
FIG. 1 is a graphical comparison of the manner in which several platinum promoted catalysts age with respect to oxidation activity.

The invention provides a technique for imparting CO oxidation activity to cracking catalysts generally. Thus it may be applied for promotion of acid treated clay and amorphous silica-alumina catalysts as well as the modern catalysts embodying synthetic crystalline aluminosilicate zeolites, for example those described in U.S. Pat. No. 3,140,249. The invention contemplates addition to the circulating catalyst inventory in a moving catalyst system for catalytic cracking, either Thermofor Catalytic Cracking (TCC) or Fluid Catalytic Cracking (FCC). As previously pointed out, fresh catalyst is added to such systems during operation in order to maintain volume of the catalyst inventory in the system and/or to maintain cracking activity of the catalyst at a desired level. In applying the present invention, the mixed catalyst here described may be added for the sole purpose of imparting carbon monoxide oxidation activity upon withdrawal of a suitable portion of the circulating catalyst inventory. Such catalyst addition for the sole purpose of imparting oxidation activity will be unusual. For example, if the CO boiler is unexpectedly taken off-stream in a unit having catalyst of little or no CO oxidation activity, this unusual step avoids need to discontinue charge to the cracking unit in order to comply with restrictions on discharge of CO to the atmosphere.

The catalyst blend of the invention is provided by mixing a major portion of unpromoted catalyst with a minor portion of catalyst or an inert material having CO oxidation activity in proportions to give a desired metal content of the mixture preferably below 5 ppm. The unpromoted catalyst is any of the many cracking catalysts known to be effective for the purpose in a particle size suited to the needs of the particular style of unit, TCC or FCC. The unpromoted catalyst is fresh catalyst in the sense that the same has not been part of the circulating catalyst inventory in the cracking unit to be promoted. The metal promoted catalyst may be metal on any suitable porous solid base but will usually have a base support of the same nature as the unpromoted cracking catalyst. In one aspect, the catalyst of this invention will be prepared from a high quality cracking catalyst by impregnating a relatively small portion with a compound of a metal of periods 5 and 6 of Group VIII of the Periodic Table or rhenium, that is with ruthenium, rhodium, palladium, osmium, iridium, platinum or rhenium or a combination of two or more of those metals. The impregnation is conducted in known fashion with a solution of a compound of the metal followed by calcining, for example with an aqueous solution of chlorplatinic acid. The impregnated portion of catalyst will be treated to contain 10 to 1000, preferably 20 to 80 ppm of metal, preferably platinum. Metal impregnated catalyst is then blended with unpromoted catalyst in proportions to provide a mixture containing 5 ppm or less of metal. The two component mixture is blended under conditions to promote intimate and substantially uniform dispersion of the minor component (metal promoted catalyst) throughout the whole.

The characteristics of the new catalyst blend are shown by a series of representative mixtures of 50, 100 and 200 ppm platinum promoted catalysts blended with unpromoted catalyst to a level of 5 ppm platinum in the mixture. These are compared with each other and with a catalyst prepared by impregnation of the total mass of catalyst to 5 ppm platinum. The base catalyst employed consisted of 15% of rare earth zeolite Y in a matrix of 57.4% silica, 2% zirconium oxide, 0.6% alumina and 40% clay which has been thoroughly ion exchanged with ammonium sulfate after spray drying.

Platinum in varying quantities was incorporated by impregnating the dried catalyst base with solutions containing suitable quantities of platinum tetrammine chloride, followed by drying. All catalysts were mildly steamed (4 hrs—1400° F.—0 psig) in a fludized bed after preheating in $N_2$. Catalyst blends were prepared by physical mixing of steamed catalysts.

Catalyst blends were tested for cracking activity and selectivity, followed by testing for CO oxidation activity. The catalyst samples were used to crack a Wide-Cut Midcontinent Gas oil (29.2 API) in a fixed-fluidized bed at 920° F., 3 catalyst to oil, 8.3 WHSV for evaluation of cracking activity and selectivity. The coked sample from this test was blended to 0.65% C-on-Cat with uncoked catalyst and treated with air (215 cc/min) at 1240° F. or 1340° F. The $CO_2/CO$ ratio in the effluent gas is a measure of CO oxidation activity.

Catalysts containing 50, 100 and 200 ppm Pt were blended with the base catalysts to give a total of 5 ppm Pt. These blends were then compared with a catalyst containing 5 ppm Pt homogeneously dispersed by impregnation. Cracking activity and selectivity data in Table 1 show that blending has no deleterious effect on activity. The CO oxidation activities show that the 1:9 blend from the 50 ppm Pt catalyst has a higher activity than either the homogeneous 5 ppm Pt catalyst or blends from higher Pt levels:

| CO Oxidation Activities at 5 PPM Pt | | |
|---|---|---|
| Pt Content of Promoted Catalyst, ppm | Blend Ratio, Promoted:Unpromoted | Oxidation Activity, $CO_2/CO$ @ 1240° F. |
| 5 | 1:0 | 43 |
| 50 | 1:9 | 97 |
| 100 | 1:19 | 41 |
| 200 | 1:39 | 8 |

TABLE 1

BLENDS OF STEAMED CATALYSTS TO 5 PPM Pt

| | FROM 5 PPM | 50 PPM | 100 PPM | 200 PPM |
|---|---|---|---|---|
| Conversion, % Vol | 76.6 | 77.8 | 78.6 | 79.7 |
| $C_5{}^+$ Gasoline, % Vol | 64.9 | 64.5 | 64.3 | 64.4 |
| Total $C_4$, % Vol | 15.3 | 16.3 | 16.9 | 17.5 |
| Dry Gas, % Wt | 6.5 | 6.8 | 7.4 | 7.6 |
| Coke, % Wt | 2.65 | 3.14 | 3.19 | 3.23 |
| C-ON-CAT, Final, % Wt | .78 | .93 | .94 | .95 |
| $H_2$, % Wt | .03 | .02 | .02 | .02 |
| $H_2S$, % Wt | .19 | .18 | .21 | .17 |
| Hydrogen Factor* | 22 | 16 | 14 | 13 |

*Hydrogen Factor = $100 \times \frac{\text{Moles } H_2}{\text{Moles } C_1C_2}$

It is found that aging of metal activity is slower for the blended catalyst than for the catalyst uniformly impregnated to 5 ppm platinum. That effect is shown graphically in FIG. 1 for the four types of 5 ppm Pt. catalyst discussed above. Activities of the several catalysts for oxidation of CO were measured after exposure for varying periods to air at 1200° F. Activity for conversion of CO was determined by contacting the catalyst at 1200° F. with 215 cc/min. of a gas containing 8% $CO_2$, 4% CO and 4% $O_2$, balance inert.

Figure 2:
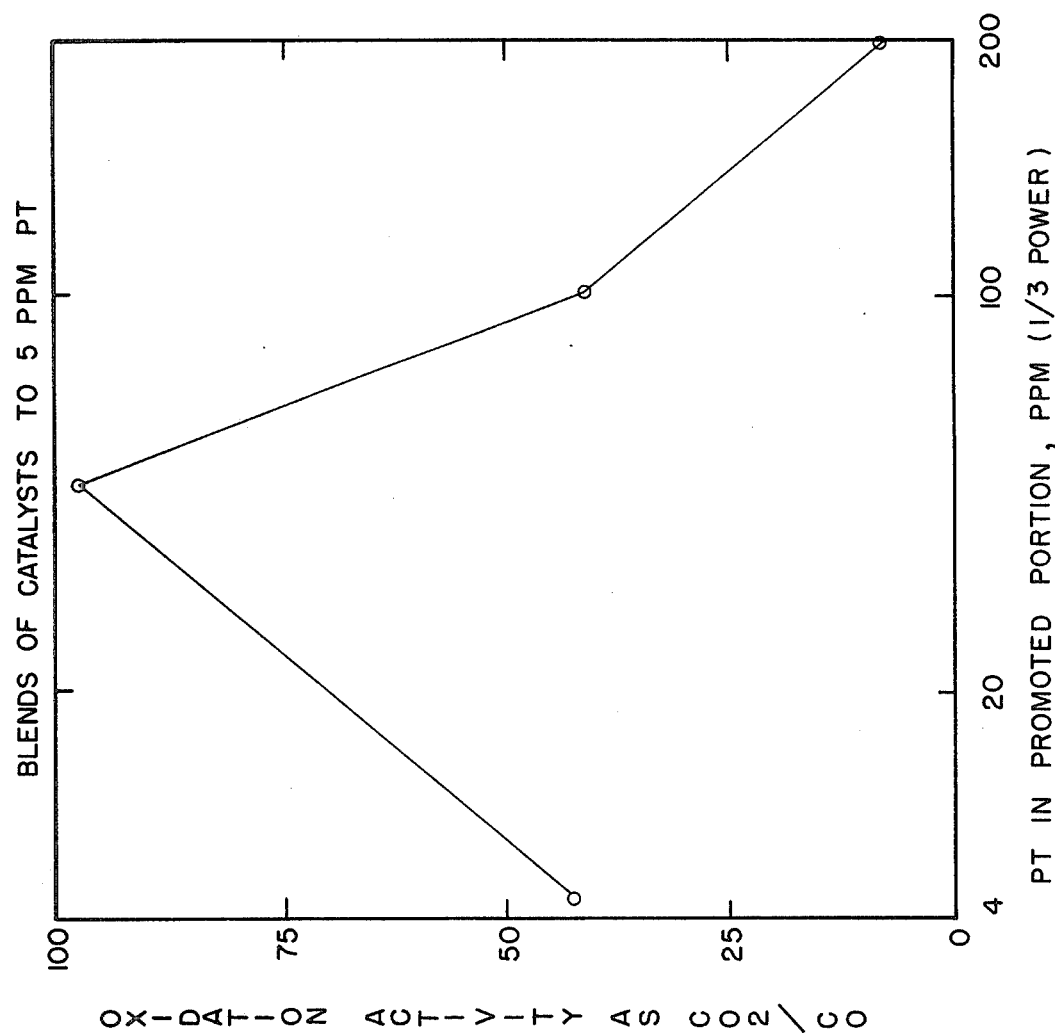
FIG. 2 is a graphical representation of the manner in which oxidation activity of a mass of catalyst at 5 ppm platinum varies; platinum content of promoted portion being plotted as the $\frac{1}{3}$ power.

The effect of promoter level on gasoline and coke selectivity and hydrogen factor at 5 ppm Pt are shown in Table 1. Hydrogen factor drops as the promoter content increases, consistent with the larger separation of particles containing Pt. However, both gasoline and coke selectivity are impaired with these steamed catalysts. The gasoline and coke factors are similar to those obtained in the catalysts actually containing 50, 100 and 200 ppm Pt, although they only constitute 10, 5 and 2% of the blend, respectively. Butane and dry gas selectivity also show the same trend. The fact that hydrogen factor shows the opposite trend is consistent with its being the result of secondary reactions; the other product selectivities are largely determined in primary cracking reactions. The oxidation activities, although high in each case, show a pronounced maximum at the 50 ppm Pt component (FIG. 2).

The maximum in oxidation activity could be the result of competing phenomena: increasing specific Pt activity, counteracted by diffusion restrictions (the increasing separation of Pt-containing particles). While inconsistent with other findings that oxidation activity empirically increases as $Pt^{\frac{1}{3}}$ at low Pt levels when Pt is homogeneously dispersed on a catalyst, which predicts decreasing specific Pt activity with increasing Pt level, the advantage of blending high Pt components is demonstrated. The relationship of activity to the ⅓ power of Pt concentration is derived from extensive experimental data not reported here. In summary those data show a linear relationship for activity in CO oxidations and cracking (including selectivity factors) when plotted against the ⅓ power of Pt uniformly dispersed through the entire catalyst mass. In other words, the specific activity of the metal (effectiveness per unit weight) declines as the metal is increased when uniformly dispersed. That effect is consistent with an explanation that larger metal crystals (less surface area) are formed at higher metal concentrations. Although that effect is not seen in the present blended catalysts, the annexed drawings plot Pt concentration as the ⅓ power since this is a convenient condensation of the longitudinal axis.

The loss of selectivity with increasing Pt content in the promoted portion is puzzling, since it suggests that a minor component (2–10%) can determine selectivity, even when both components are of comparable activity. Perhaps the low selectivity component in such a blend is always dominant.

Extension of these findings to commercial processes is complex, since the addition of a Pt-containing catalyst to operating inventory always results in a blend, but with components of different cracking activity. The results do suggest, however, that addition of catalysts containing 50–100 ppm Pt, even blended to lower Pt levels (1–5 ppm) with unpromoted catalyst, could result in higher oxidation activity.

When the promoter metal is supplied on calcined but unsteamed cracking catalyst as support, effects on CO combustion are like those reported above for steamed catalyst support, but without adverse effect on cracking selectivity. The catalyst employed for support in the runs described below was a rare earth zeolite Y type fluid cracking catalyst impregnated with platinum at levels of 5, 50, 100 and 200 ppm. The resultant promoters were blended with equilibrium catalyst from a commercial FCC Unit in proportions to provide a net amount of 1 ppm platinum in the blends. Those four blends were compared with the same equilibrium catalyst in cracking runs. The results are shown in Table 2 which also reports the results of a cracking run with the unpromoted equilibrium catalyst.

TABLE 2

BLENDS OF EQUILIBRIUM WITH CALCINED CATALYSTS TO 1 PPM PT

| | FROM 5 PPM | 50 PPM | 100 PPM | 200 PPM | NO PT |
|---|---|---|---|---|---|
| TREATMENT: HOURS | 1.0 | 1.0 | 1.0 | 1.0 | — |
| : TEMPERATURE, DEG. F. | 1000 | 1000 | 1000 | 1000 | — |
| : % STEAM | 0 | 0 | 0 | 0 | — |
| CAT/OIL | 3.00 | 3.00 | 2.99 | 2.99 | 2.99 |
| WHSV | 8.33 | 8.33 | 8.35 | 8.35 | 8.35 |
| REACTION TEMPERATURE, DEG. F. | 918 | 918 | 918 | 918 | 921 |
| CONVERSION, % VOL. | 77.4 | 76.6 | 77.5 | 75.6 | 74.8 |
| $C_5{}^+$ GASOLINE, % VOL. | 64.9 | 63.8 | 65.5 | 62.7 | 62.7 |
| TOTAL $C_4$, % VOL. | 15.8 | 15.7 | 15.6 | 15.9 | 15.9 |
| DRY GAS, % Wt. | 6.4 | 6.9 | 6.5 | 6.8 | 6.2 |
| COKE, % WT. | 2.86 | 2.79 | 2.85 | 2.90 | 2.78 |
| C-ON-CAT, FINAL, % WT | .85 | .83 | .84 | .85 | .81 |
| $nC_5$, % VOL. | 1.1 | 1.0 | 1.0 | .9 | 1.0 |
| $iC_5$, % VOL. | 7.8 | 8.0 | 7.9 | 7.5 | 7.5 |
| $C_5{}^-$, % VOL. | 2.6 | 2.7 | 2.6 | 2.5 | 2.7 |
| $nC_4$, % VOL. | 2.1 | 2.0 | 2.0 | 2.0 | 2.1 |
| $iC_4$, % VOL. | 8.1 | 8.1 | 8.1 | 8.3 | 8.1 |
| $C_4{}^-$, % VOL. | 5.6 | 5.6 | 5.5 | 5.6 | 5.7 |
| $C_3$, % VOL. | 2.7 | 2.9 | 2.8 | 2.9 | 2.7 |
| $C_3{}^-$, % VOL. | 5.7 | 6.2 | 5.8 | 6.1 | 5.7 |
| $C_2$, % WT. | .4 | .4 | .4 | .4 | .4 |
| $C_2{}^-$, % WT. | .5 | .5 | .5 | .5 | .4 |
| $C_1$, % WT. | .4 | .4 | .4 | .4 | .3 |
| $H_2$, % WT. | .03 | .03 | .03 | .03 | .02 |
| $H_2S$, % WT. | .17 | .15 | .14 | .17 | .13 |
| HYDROGEN FACTOR | 31 | 26 | 26 | 27 | 27 |
| RECOVERY, % WT. | 99.0 | 99.8 | 98.1 | 97.2 | 97.3 |

The effectiveness of the blends of equilibrium FCC catalyst with platinum promoted catalyst for cracking is summarized in Table 3 which also reports oxidation activity for each of the blends. The data in Table 3 are particularly interesting for the showing of maximum properties for blends in which the promoted portions contains about 50 ppm of platinum. It should be noted further that cracking activity is not seriously affected by high metal concentration on the promoted portions. Selectivity is about the same for the four blends in most respects except hydrogen factor, where positive improvement is shown at 50 ppm platinum on the promoted portions.

TABLE 3

BLENDS OF PT PROMOTED CATALYST WITH EQUILIBRIUM CATALYST

SUMMARY OF ACTIVITY

| | | | | |
|---|---|---|---|---|
| PT CONTENT OF PROMOTER, PPM | 5 | 50 | 100 | 200 |
| PT CONTENT OF BLEND, PPM | 1.0 | 1.0 | 1.0 | 1.0 |
| CONVERSION, % VOL. | 77.4 | 76.6 | 77.5 | 75.6 |
| $C_5^-$ GASOLINE, % VOL. | 64.9 | 68.8 | 65.5 | 62.7 |
| TOTAL BUTAINES, % VOL. | 15.8 | 15.7 | 15.6 | 15.9 |
| DRY GAS, % WT. | 6.4 | 6.9 | 6.5 | 6.8 |
| COKE, % WT. | 2.86 | 2.79 | 2.85 | 2.90 |
| HYDROGEN FACTOR | 31 | 26 | 26 | 27 |
| CRACKING FACTORS | | | | |
| RELATIVE ACTIVITY, % | 100 | 99 | 100 | 98 |
| RELATIVE GASOLINE FACTOR, % | 100 | 99 | 101 | 99 |
| RELATIVE BUTANES FACTOR, % | 100 | 101 | 99 | 108 |
| RELATIVE DRY GAS FACTOR, % | 100 | 109 | 101 | 109 |
| RELATIVE COKE FACTOR, % | 100 | 101 | 100 | 96 |
| RELATIVE HYDROGEN FACTOR, % | 100 | 82 | 83 | 85 |
| OXIDATION ACTIVITY | | | | |
| $CO_2/CO$ at 1340° F. | 6.07 | 7.61 | 6.51 | 4.73 |
| RELATIVE $CO_2/CO$ ACTIVITY | 1.0 | 1.3 | 1.1 | .8 |
| RELATIVE CO CONVERSION, % | 0 | 18 | 6 | −23 |

In addition to the above discussed blends of active, unpromoted cracking catalyst with a promoter portion of a platinum group metal or rhenium on a cracking catalyst support, the invention also contemplates promoter portions of such metal on a porous solid which is substantially inert, e.g. calcined clays such as kaolin.

The promoted additive on a non-cracking base was prepared by impregnating a calcined spray dried kaolin clay with tris (ethylenediamine) platinum chloride to provide 50 ppm of platinum. The clay was prepared by calcining kaolin for 6 hrs. at 1800° F. followed by calcination for 1.5 hrs. at 1000° F. Separate samples of the promoted clay additive were prepared by calcining for three hours in air at 1200° F. and by steaming for four hours at atmospheric pressure and 1400° F. after heating in air.

The promoted clay was blended with equilibrium FCC zeolite cracking catalyst to platinum levels of 2.5–10 ppm based on weight of the blend. The effects of the two additives on oxidation activity are shown by the data reported in Table 4. It will be seen that the sample calcined in air showed higher activity. Both calcined and steamed additives show sufficient activity for partial or complete CO combustion during FCC regeneration ($CO_2/CO$ 10 at 1240° F.)

TABLE 4

| | Addition of 50 ppm Pt Kaolin to Equilibrium Catalyst | | | | | |
|---|---|---|---|---|---|---|
| Pt Catalyst Treatment | % Pt Cat. | Pt, ppm (Est) | T. °F. | $CO_2$ | CO | $CO_2/CO$ |
| Blank | — | — | 1340 | 8.1 | 2.55 | 3.2 |
| | | | 1240 | 10.3 | 2.2 | 4.7 |
| | | | 1140 | 7.1 | 2.9 | 2.45 |
| 3 hrs./1200° F./air | 5 | 2.5 | 1340 | 9.1 | 1.85 | 4.9 |
| | 10 | 5 | 1340 | 9.5 | 1.30 | 7.3 |
| | | | 1240 | 10.5 | 0.45 | 23.3 |
| | | | 1140 | 9.4 | 0.20 | 47.0 |

TABLE 4-continued

| | Addition of 50 ppm Pt Kaolin to Equilibrium Catalyst | | | | | |
|---|---|---|---|---|---|---|
| Pt Catalyst Treatment | % Pt Cat. | Pt, ppm (Est) | T. °F. | $CO_2$ | CO | $CO_2/CO$ |
| | 20 | 10 | 1340 | 9.4 | 0.70 | 13.4 |
| 4 hrs./1400° F./0 psig | 5 | 2.5 | 1340 | 7.0 | 2.0 | 3.5 |
| | 10 | 5 | 1340 | 8.3 | 2.0 | 4.15 |
| | | | 1240 | 10.0 | 0.92 | 10.9 |
| | | | 1140 | 9.5 | 0.20 | 47.5 |
| Regeneration Test: | 20 | 10 | 1340 | 7.9 | 1.15 | 6.9 |

215 cc/min. air
4 min. catalyst residence time

Carbon on Catalyst = 0.65% wt.

What is claimed is:

1. A catalyst mixture adapted for addition to a plant for continuous catalytic cracking of hydrocarbons and continuous oxidation regeneration of spent catalyst from said catalytic cracking with combustion of CO during said regeneration which mixture comprises an intimate and substantially uniform blend of a minor portion of particles containing from 20 to 80 ppm of platinum, iridium, osmium, palladium, rhodium, ruthenium or rhenium and a major portion of active cracking catalyst, the proportions of said minor and major portions being such that said blend contains no more than 10 ppm of said metal.

2. A mixture according to claim 1 wherein the particles of said minor portion are constituted by active cracking catalyst impregnated with said metal which particles have been calcined in air without added steam.

3. A mixture according to claim 1 wherein the particles of said minor portion are constituted by active cracking catalyst impregnated with said metal.

4. A mixture according to claim 1 wherein the particles of said minor portion are constituted by a porous solid which is substantially inert impregnated with said metal.

5. A mixture according to claim 1 wherein the particles of said minor portion are constituted by calcined spray dried kaolin clay impregnated with said metal.

6. A mixture according to claim 1 wherein said minor portion contains about 50 ppm of said metal.

7. A mixture according to claim 1 wherein said blend contains 1 to 5 ppm of said metal.

8. A mixture according to claim 1 wherein said metal is platinum.

9. A mixture according to claim 5 wherein said major portion of active cracking catalyst is a rare earth zeolite Y type cracking catalyst.

10. A mixture according to claim 1 wherein both said major and minor portions are constituted by rare earth zeolite Y type cracking catalyst.

* * * * *

UNITED STATES PATENT AND TRADEMARK OFFICE
CERTIFICATE OF CORRECTION

PATENT NO. : 4,235,754
DATED : November 25, 1980
INVENTOR(S) : Arthur W. Chester It is certified that error appears in the above-identified patent and that said Letters Patent are hereby corrected as shown below:

Column 8, line 52, "$C_5^+$" should read -- $C_5^+$ --

Column 8, line 57, "$C_5^-$" should read -- $C_5^-$ --

Column 8, line 59, "$C_4^-$" should read -- $C_4^-$ --

Column 8, line 62, "$C_3^-$" should read -- $C_3^-$ --

Column 8, line 64, "$C_2^-$" should read -- $C_2^-$ --

Column 9, line 21, in Table 3, "$C_5^-$" should read -- $C_5^+$ --

Column 9, line 21, in Table 3, "68.8" should read -- 63.8 --

Column 9, line 22, in Table 3, "BUTANIES" should read -- BUTANES --.

Signed and Sealed this

Sixteenth Day of June 1981

[SEAL]

Attest:

RENE D. TEGTMEYER

Attesting Officer — Acting Commissioner of Patents and Trademarks